United States Patent

[11] 3,581,116

[72] Inventor Joseph Leostic
Le Mesnil Saint-Denis, France

[21] Appl. No. 757,441
[22] Filed Sept. 4, 1968
[45] Patented May 25, 1971
[73] Assignee C.I.T. Compagnie Industrielle Des Telecommunications
Paris, France
[32] Priority Sept. 4, 1967
[33] France
[31] 119905

[54] DIGITAL CONTROLLED STEP VOLTAGE GENERATOR
11 Claims, 3 Drawing Figs.

[52] U.S. Cl. .......... 307/264, 235/92, 328/41, 328/48, 328/127, 328/46, 340/347, 307/227
[51] Int. Cl. .......... H03k 25/00
[50] Field of Search .......... 235/92 - ,37,52,63,73), (Inquired); 328/42, 41, 44, 48, 127, 186; 307/220, 227, 264; 340/347

[56] References Cited

UNITED STATES PATENTS

| | | | |
|---|---|---|---|
| 2,958,828 | 11/1960 | Schreiber | 328/186 |
| 3,200,339 | 8/1965 | Gorlin | 328/46 |
| 3,206,665 | 9/1965 | Burlingham | 328/44X |
| 3,238,462 | 3/1966 | Ballard et al. | 328/44X |
| 3,424,986 | 1/1969 | Vasseur | 328/48 |
| 3,447,149 | 5/1969 | Groth | 235/92X |

*Primary Examiner*—John S. Heyman
*Attorney*—Craig and Antonelli

ABSTRACT: Digital-controlled generator supplying, during a major cycle, a continuous voltage which is proportional to the fraction $i/N$ of a fixed voltage, with $i$ variable in units from O to N, said major cycle having a duration of K minor cycles, of which each lasts N times an elementary duration $t_\sigma$

DIGITAL CONTROLLED STEP VOLTAGE GENERATOR

This invention relates to a voltage generator intended to generate a voltage varying in steps, for example covering a voltage range of between O and U volts, and arranged in particular to perform a complete scan from O to U volts either once or repetitively, or else to stop at an intermediate position, or to produce a positive or negative increment from an intermediate position.

A voltage generator designed to produce a voltage variable in steps is advantageously employed, among other purposes, in radio equipment having an oscillator arranged to deliver different frequencies during an exploring or scanning process in which it is controlled by a polarizing voltage varied in steps.

Scanning processes using an oscillator generally employ one or two methods. Either a sawtooth voltage is applied to a variable capacity diode forming part of the oscillator, or alternatively a voltage varying in steps is applied to the diode. The present invention relates to a generator usable with the latter arrangement.

It is known that a voltage varying in steps may be generated by means of an electromechanical stepping device, such as a suitably connected uniselector. The uniselector essentially comprises a ratchet wheel advancing by one notch for each electrical pulse received. Instruments of this nature are in widespread use in telephony applications, in which they yield excellent results.

The number of notches available in a uniselector is not, however very great and seldom exceeds fifty, in practice. Also the highest stepping speed obtainable is only of the order of a few tens of steps per second, for example 20 steps per second. Additionally, this device has only one direction of operation.

As soon as it becomes necessary to produce a much higher number of steps therefore, for example several thousands, in a few seconds to obtain maximum capacity and maximum speed, the electromechanical stepping switch must give way to an electronic method.

A high-definition and high-speed "electronic stepping device" may be built up from a timing system of appropriate frequency, for example amounting to several megacycles, by means of an adding-subtracting counter and a numerical-analog converter, coordinated with a so-called "ponderator." If several thousand steps are to be produced however, the converter-ponderator combination becomes a complex item of apparatus, comprising several decades, incorporating a great number of components and being consequently expensive.

An object of the invention is the provision of an improved voltage generator able to provide a voltage which varies in steps.

In accordance with the present invention a voltage generator intended to generate voltage in steps, comprises: means for generating a rectangular electrical signal pulse having the duration $i \cdot t_o$ in which $t_o$ is a constant interval and $i$ is a selected integer which can vary between zero and a maximum of $N$ during a minor cycle having the duration $T$, with $T = i\ N \cdot t_o$; means for successively reproducing $K$ indentical minor cycles together constituting a major cycle having the duration $KT$; and, integrating means providing a constant voltage at an output terminal throughout the period of a major cycle, this voltage being proportional to the integer $i$.

The electronic voltage generator of the invention has the advantage that it can be designed to operate at several thousand successive steps in a few seconds, to stop at an intermediate position, and to operate in either direction from an intermediate position, such generator yet being simple and inexpensive to manufacture.

The invention will now be described in more detail, by way of example, with reference to the accompanying drawings, in which.

Figures 1, 3:
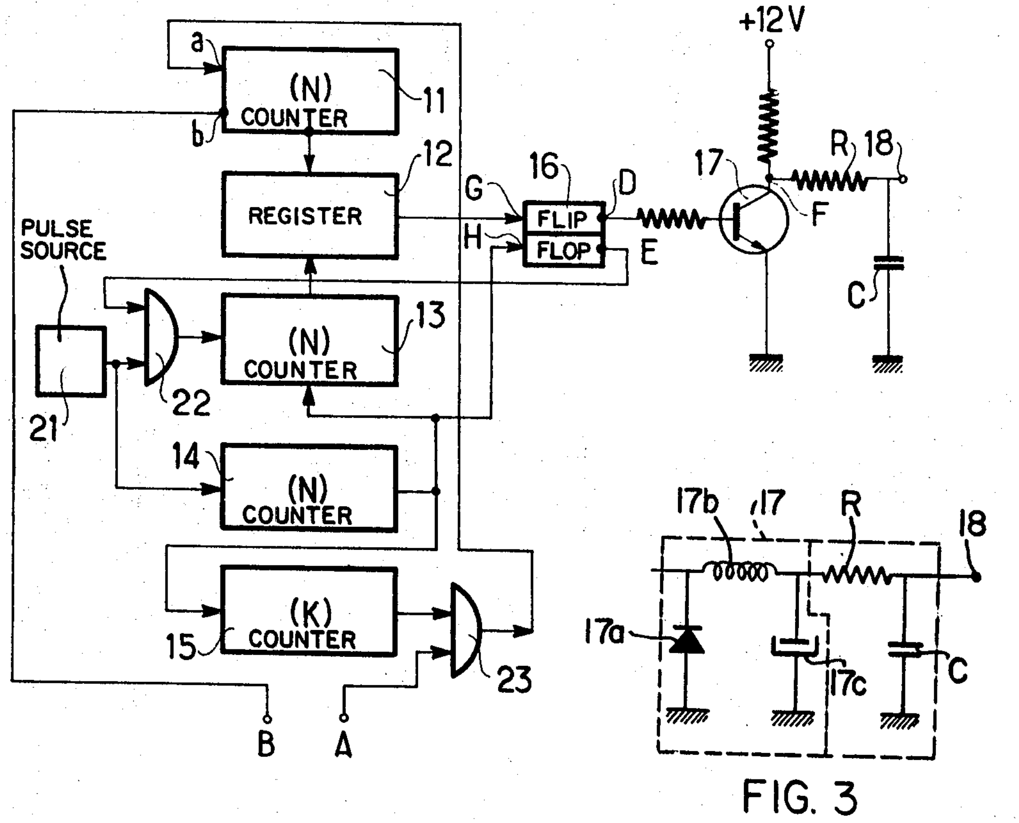
FIG. 1 is a schematic block diagram of a generator in accordance with the invention.
FIG. 3 is a modification of the integrator of FIG. 1.

In FIG. 1, a counter 11 of capacity $N$ receives pulses to be counted at input terminal $a$ and performs addition or subtraction according to the polarity of a control voltage applied at input terminal $b$, for example adding for a positive voltage at $b$, and subtracting for a negative voltage at $b$. Counters of this nature are well known in the art. The instantaneous value stored in the counter 11 varies relatively slowly, increasing or diminishing by one unit at intervals $KT$. The values of $K$ and of $T$ are explained in more detail hereinbelow. The pulses fed to terminal $a$ are supplied by an AND gate 23, whose function is also explained below.

Another counter 13 having the capacity $N$ is connected to receive counting pulses at intervals $t_o$ applied by a timing system in the form of a pulse source 21 through an AND gate 22. A third counter 14 also having the capacity $N$, is connected to receive counting pulses directly from the output terminal of the timing system 21. The output terminal of the counter 14 is connected to the input terminal of a fourth counter 15 having a capacity $K$.

The output terminal of the counter 15 is connected to one input terminal of the AND gate 23 whose output terminal is connected to the terminal $a$ of the counter 11. The gate 23 has another input terminal which is connected to an input control terminal A. The control terminal A can assume a binary value 1 to make the gate 23 conductive, and a binary value 0 to block the gate 23.

A coincidence register 12 is connected, on the one hand, to the output of counter 11 and, on the other hand, to the output of counter 13, and supplies an output pulse when the counter 13 displays the same value as the counter 11.

A bistable flip-flop 16 has an input terminal G connected to the output terminal of the register 12 and output terminal D connected to the input terminal of an integrator 17. It is possible, for example, for the output terminal D of the flip-flop 16 to be set at a voltage of +12 volts for a logical value 0 and at a voltage of 0 volts for a logical value 1.

The integrator 17 may comprise a known type of storage cell composed of a transistor 17 having its base electrode connected via resistor $R_1$ to the output terminal D of the flip-flop 16, the collector of which is connected via resistor $R_3$ to a source of supply voltage and the emitter of which is grounded. The collector of the transistor 17 is also connected via resistor $R_2$ to the output terminal 18, to which capacitor C is connected in shunt. The transistor in combination with the RC filter performs an integration of the output from flip-flop 16.

A complementary output terminal E of the flip-flop 16 is connected to a control input terminal of the AND gate 22. The output terminal of the counter 14 which is connected to the input terminal of the counter 15 is also connected to the counter 13 for resetting it to zero and to a second input terminal H of the flip-flop 16.

When, during a so-called minor counting cycle, the register 12 detects the same value $i$ at both its input terminals, it feeds a binary value of 1 to the input terminal G of the flip-flop 16. The counter 14 which operates as a fixed order N divider, provides an output pulse each time it has received N input pulses. The counter 15 which operates as a fixed order K divider, provides an output pulse each time it has received K input pulses from the counter 14.

Terminal B may receive a positive signal, in which case the counter 11 is operative in an adding sense, since the input terminal $b$ of the counter 11 has a positive polarity, or it may receive a negative signal, in which case the counter 11 operates in a subtractive sense.

The circuitry operates as follows:

It is assumed that the value of the signal at terminal A is 1, that the signal at B is positive and that the counter 11 indicates a value $i$. Beginning after a resetting action to zero (the method employed becoming apparent hereinafter), the flip-flop 16 is in the quiescent condition, the terminal D carries the value 0 (+12 volts) and the terminal E the value 1 (0 volts), the AND gate 22 is conductive and counter 11 has a count $i$. The timing pulses from 21 are therefore received by the counter 13. The timing pulses are also received directly by the dividing counter 14.

Figure 2:
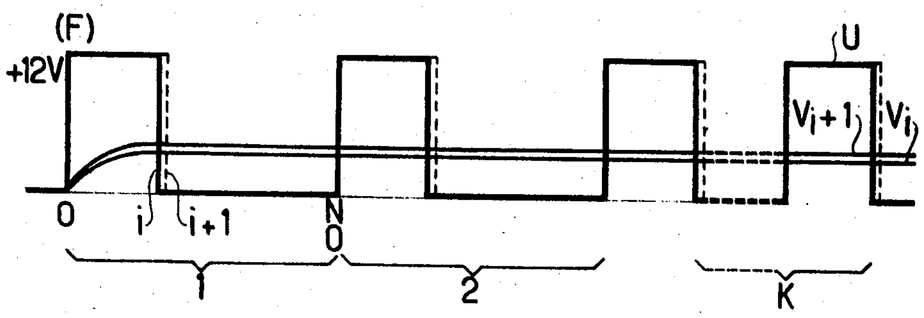
FIG. 2 is a sketch explaining graphically its operation.

When the instantaneous value *i*, which is less than N, is reached in the counter 13, the coincidence register 12 detects coincidence between the counts in counters 11 and 13 and feeds the analog value 1 to the input terminal G of the flip-flop 16. As a result, the point D incurs a voltage drop from +12 to 0 volts, as shown in FIG. 2. AND gate 22 is thereby rendered nonconductive so that counter 13 no longer receives pulses from timing system 21.

The time required for the timing pulses to fill the counter 14 represents a minor cycle having the duration T. At the end of a minor cycle T, the counter 14 feeds a pulse to the input terminal of the dividing counter 15. The pulse emitted every time the counter 14 passes through its maximum capacity point N resets the counter 13 and the flip-flop 16 and thereby renders AND gate 22 conductive once again, so that counter 13 may begin a new count for the next minor cycle T.

The minor cycles T are then repeated with the count in counter 15 increasing by one for each minor cycle. The dividing counter 15, when filled, feeds a pulse to the open conductive gate 23 and thus to the counter 11 at the end of a major cycle of duration KT.

The pulse reaching the counter 11 from gate 23 at the end of K cycles causes an advance of one unit in the latter. Henceforth, the register 12 will detect a coincidence for *i*+1, and so on and so forth: the counter 11 being advanced by one unit every K minor cycles, the state of coincidence will thus occur for a counting condition plus one unit.

If the terminal B is negative, the count stored in counter 11 would be reduced by one unit in each case, instead of being increased. If the binary value 0 is applied to the terminal A, the gate 23 is blocked and the counting condition of the counter 11 remains constant. The coincidence register 12 would then provide output pulses recurring indefinitely for the same state *i*.

FIG. 2 shows the rectangular pulses, K in number, reaching point D at the input terminal of the integrator 17 as well as the voltage level obtained at the output terminal 18. When the order of the steps rises from *i* to *i*+1, the width of the rectangular pulses increases by one unit in width and the height of the output level rises by one unit, passing from V*i* to V*i*+1. If the width of the rectangular pulses remains constant, one obtains a permanent level at the output terminal.

The detailed functional analysis given above demonstrates that the voltage generator possesses the following features:

It operates according to an indefinitely repeated uniform minor cycle corresponding to N pulses.

Each step of the output voltage has the duration of a major cycle which is equal to K minor cycles each having the duration T.

The scan may be stopped at a predetermined step, which is maintained for as long as desired.

The electrical value of a step, for example in volts, is given by an integration period defined by the order *i* of the step.

If $t_o$ is the interval separating two timing pulses, the duration of a minor cycle T is equal to N$t_o$, the integration period during a cycle is $t_1$=*i* $t_o$, the duration of a major cycle is equal to $t_2$=KT =KN $t_o$, and the duration of one complete scan is equal to $t_3$=N$t_2$=KN$^2t_o$.

As an example of applying this formula, a timing frequency of 10 mc/s ($t_o$–$10^{17}$s) may be adopted, with N=1,000 and K=10. According to the formula given above, the duration of a complete scan amounts to: $t_3$=K·N$^2$·$t_o$–1 second.

A modification of the integrator 17 of FIG. 1 is illustrated in FIG. 3. In this embodiment the integrator is composed of a diode 17*a*, an inductor 17*b*, a capacitor 17*c* and a cell RC. At the output terminal 18, a voltage varying by steps is obtained. A member 24, under the action of the maximum capacity of the counter 11, resets the voltage varying in steps to zero by means of a line 25, and this by completely discharging integrator 27 when the Nth and last step is reached.

The common emitter amplifier stage formed by transistor 17 of FIG. 1 is replaced by the integrator arrangement of FIG. 3, and in every other respect conforms to the first described embodiment.

I have shown and described several embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. A voltage generator intended to generate voltage in steps, comprising: first means for generating a rectangular electrical signal pulse having the duration $i{\cdot}t_o$ in which $t_o$ is a constant interval and *i* is a selected integer which can vary between zero and a maximum of N during a minor cycle having the duration *T*, with $T=N{\cdot}t_o$; second means responsive to said first means for successively reproducing *K* identical minor cycles together constituting a major cycle having the duration KT; and, integrating means connected to said first means for providing a constant voltage at an output terminal throughout the period of a major cycle, this voltage being proportional to the integer *i*, wherein said second means includes third means for selectively altering the integer *i* by either +1 or by −1 for each major cycle, in which said first means includes a timing pulse generator providing pulses at an interval $t_o$; a first adding and subtracting counter possessing the capacity N which stores a numerical value *i* selected between zero and N; a second counter having the capacity N and connected to receive timing pulses from said timing pulse generator by way of a first gating circuit; a coincidence register connected to said first and second counters providing a switching signal on detecting coincidence between the instantaneous value indicated by the said second counter and the value *i* stored in the first counter; a third counter having the capacity N and connected to receive the timing pulses directly and continuously from said timing pulse generator and operating as a fixed order N divider having its output terminal delivering a pulse for the resetting of the second counter to zero on completion of each count N; a fourth counter connected to the output of said third counter having the capacity K operating as a fixed order K divider, where K is numerically substantially less than N, the output from the said fourth counter, when filled, being connected to the first counter; and an electronic switching circuit switched between two respective stable states by said switching signal and by the pulse from said third counter, the switching circuit providing a square wave voltage pulse of constant height and of a width proportional to the said number *i* for each minor cycle such square wave pulse being fed to the input side of the integrating means.

2. A voltage generator as defined in claim 1, in which the first counter is provided with external controls enabling it to act, selectively, as an addition counter or as a subtraction counter.

3. A voltage generator as defined in claim 1 in which the switching circuit comprises a bistable multivibrator.

4. A voltage generator as defined in claim 1 wherein said integrating means includes a storage cell formed by a series inductance, a shunt diode and a shunt capacitor connected between the output of said first means and a resistance-capacitance filter cell.

5. A voltage generator as defined in claim 1 wherein said integrating means includes a transistor amplifier connected between the output of said first means and a resistance-capacitance filter cell.

6. A voltage generator comprising a source of timing pulses provided at constant intervals $t_o$, first counting means connected to said source of timing pulses for generating a switching pulse after *i* timing pulses in each minor cycle of duration T, bistable means connected to said first counting means for generating a rectangular signal pulse of duration $i \cdot t_o$ during each minor cycle T, and second counting means connected to said first counting means for selectively varying the value $i$ at which said switching signal is generated.

7. A voltage generator as defined in claim 6 wherein said first counting means includes first and second counters connected to a coincidence circuit producing said switching pulse upon detection of coincidence in the counts in said first and second counters, said first counter having a count $i$ and said second counter being connected to said source of timing pulses via a gate, and a third counter connected directly to said pulse source and having a maximum count of $T/t_o$.

8. A voltage generator as defined in claim 7 wherein said bistable means is connected to said gate to disconnect said second counter from said pulse source during the remaining portion of each minor cycle T after generation of said rectangular signal pulse.

9. A voltage generator as defined in claim 8 wherein said second counting means includes a fourth counter connected to said third counter to be advanced one unit each time said third counter reaches its maximum count and providing a stepping signal each time it reaches its maximum count, and means to apply said stepping signal to said first counter to alter the count $i$ therein by one unit.

10. A voltage generator as defined in claim 9 wherein said first counter is of the type capable of selective addition or subtraction in response to an applied external control signal.

11. A voltage generator as defined in claim 6 wherein integrating means is connected to the output of said bistable means to provide a constant voltage output in steps proportional to the value $i$.